(12) United States Patent
Hamilton et al.

(10) Patent No.: US 11,861,510 B2
(45) Date of Patent: *Jan. 2, 2024

(54) SYSTEMS AND METHODS OF GENERATING DATASETS FROM HETEROGENEOUS SOURCES FOR MACHINE LEARNING

(71) Applicant: Nasdaq, Inc., New York, NY (US)

(72) Inventors: Douglas Hamilton, Boston, MA (US); Michael O'Rourke, Southbury, CT (US); Xuyang Lin, Cambridge, MA (US); Hyunsoo Jeong, Boston, MA (US); William Dague, New York, NY (US); Tudor Morosan, Toronto (CA)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,094

(22) Filed: Jan. 6, 2023

(65) Prior Publication Data

US 2023/0142808 A1 May 11, 2023

Related U.S. Application Data

(63) Continuation of application No. 16/368,804, filed on Mar. 28, 2019, now Pat. No. 11,568,170.

(Continued)

(51) Int. Cl.
*G06F 16/00* (2019.01)
*G06N 5/022* (2023.01)
(Continued)

(52) U.S. Cl.
CPC ........... *G06N 5/022* (2013.01); *G06F 16/254* (2019.01); *G06F 18/2113* (2023.01);
(Continued)

(58) Field of Classification Search
CPC .......... G06N 5/022; G06N 5/01; G06N 20/00; G06F 16/254; G06F 18/2148; G06F 18/2113
See application file for complete search history.

(56) References Cited

U.S. PATENT DOCUMENTS

| 6,882,990 B1 * | 4/2005 | Barnhill | ................ G06F 18/214 706/12 |
| 7,318,051 B2 * | 1/2008 | Weston | ............... G06F 18/2113 706/12 |

(Continued)

OTHER PUBLICATIONS

Notification of Transmittal of the International Search Report and the Written Opinion of the International Searching Authority, or the Declaration in PCT Application No. PCT/2019/024760 dated Jun. 25, 2019, 15 pages.

(Continued)

*Primary Examiner* — Jared M Bibbee
(74) *Attorney, Agent, or Firm* — Nixon & Vanderhye P.C.

(57) ABSTRACT

A computer system is provided that is programmed to select feature sets from a large number of features. Features for a set are selected based on metagradient information returned from a machine learning process that has been performed on an earlier selected feature set. The process can iterate until a selected feature set converges or otherwise meets or exceeds a given threshold.

20 Claims, 5 Drawing Sheets

Related U.S. Application Data

(60) Provisional application No. 62/650,521, filed on Mar. 30, 2018.

(51) Int. Cl.
*G06N 20/00* (2019.01)
*G06F 16/25* (2019.01)
*G06F 18/214* (2023.01)
*G06F 18/2113* (2023.01)
*G06N 5/01* (2023.01)

(52) U.S. Cl.
CPC .......... *G06F 18/2148* (2023.01); *G06N 5/01* (2023.01); *G06N 20/00* (2019.01)

(56) References Cited

U.S. PATENT DOCUMENTS

| | | | |
|---|---|---|---|
| 2005/0216426 A1* | 9/2005 | Weston | G09B 7/00 706/12 |
| 2008/0027886 A1* | 1/2008 | Kowalczyk | G06F 18/217 706/21 |
| 2008/0097938 A1* | 4/2008 | Guyon | G06N 20/10 706/12 |
| 2014/0372346 A1* | 12/2014 | Phillipps | G06N 20/00 706/12 |

OTHER PUBLICATIONS

Notification of Transmittal and International Preliminary Report on Patentability for Application No. PCT/2019/024760, eight pages, dated Oct. 15, 2020.

* cited by examiner

SYSTEMS AND METHODS OF GENERATING DATASETS FROM HETEROGENEOUS SOURCES FOR MACHINE LEARNING

CROSS REFERENCE(S) TO RELATED APPLICATION(S)

This application is a continuation of U.S. application Ser. No. 16/368,804, filed Mar. 28, 2019, allowed; which claims priority to U.S. Provisional Application No. 62/650,521, filed Mar. 30, 2018, the entire contents of each being hereby incorporated by reference.

TECHNICAL OVERVIEW

The technology described herein relates to generating data from heterogeneous data. More particularly, the technology described herein relates to automatically generating datasets from heterogeneous sources using a machine learned feedback loop.

INTRODUCTION

Modern society generates vast amounts of diverse data. Data can from vary from weather data (e.g., temperature), to traffic data (e.g., a volume of cars on a given road), to service call data (e.g., a number of calls received), to financial data (e.g., a trading volume), to electrical production/consumption data (e.g., kilowatt-hours), to many other forms of data. Finding correlations or links between different types of data and a target problem (e.g., predicating a hurricane) can be valuable in modern society.

However, finding correlations or an appropriate dataset among a larger number of diverse datasets can be an incredibly difficult problem due to combinatorial explosion. For example, when there are hundreds or thousands of different datasets (each containing multiple different features or columns) the number of combinations could potentially exceed the number of molecules in the universe. Assessing each combination can then become computationally infeasible.

Accordingly, it will be appreciated that new and improved techniques, systems, and processes are continually sought after in this and other areas of technology. For example, techniques for generating, designing, or determining datasets from diverse heterogeneous sources.

SUMMARY

A computer system is provided that is programmed to select feature sets from a large number of features. Feature sets are selected based on metagradient information that is returned from a machine learning process performed on an earlier selected feature set. The process may iterate until a selected feature set is found that meets or exceeds a given threshold.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Figure 1:
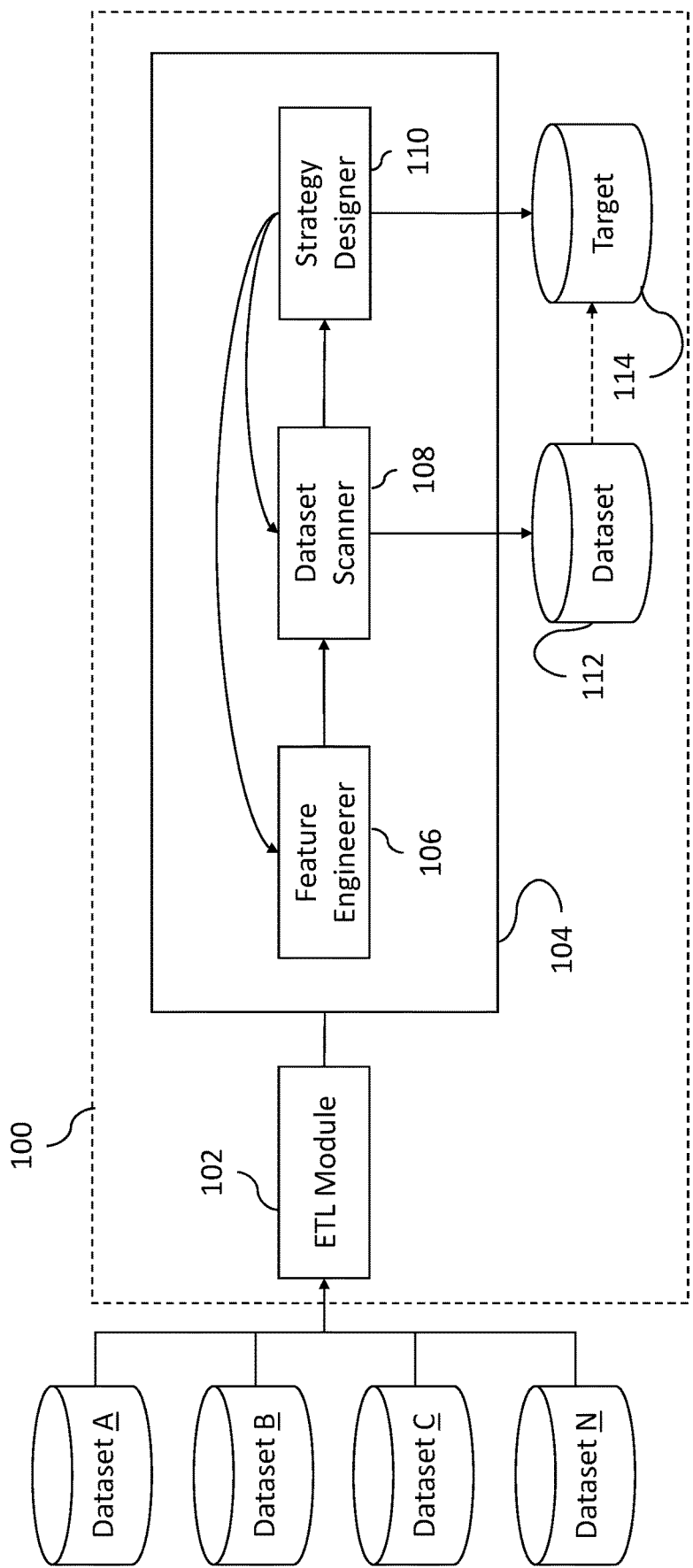
FIG. 1 is an example system architecture diagram according to certain example embodiments.

In many places in this document, including but not limited to in the description of FIG. 1, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 5.

Overview

Certain example embodiments relate to automatically designing or generating new datasets from heterogeneous data sources using a feedback loop and theory of constraints. In certain examples, data is collected from multiple different data sources, and then subsequently processed to generate engineered datasets (or engineered features). Original and engineered features are stored in a hierarchical graph that is used to select features that will be included into a feature set that is further analyzed or processed. The selected features of the feature set are processed using machine learning to generate metagradients used to change or update the hierarchical graph of the features (and the datasets to which those features belong). A new set of features is then selected and the process continues to iterate until a selected set of features produces a model and output data that matches at least one target signal. A target signal may be, for example, a production quota, a next day prediction of a stock market, next quarter earnings for a company, a target Sharpe ratio, a weather prediction, etc. . . . . . The technological improvements offered by the techniques herein can be applied in different domains, from health care, to media, to education, to finance, to security, to transportation, and many other industries and domains that have different problems—but have large (or many different) datasets that may be analyzed using the techniques herein.

The approach discussed herein allows for processing of hundreds or thousands (or even more) of different features (and a computationally infeasible number of combinations of those features).

Description of FIG. 1

FIG. 1 is an example computer system architecture diagram according to certain example embodiments. Computer system 100 receives and processes datasets A, B, C, up to dataset N. These datasets may be from the same (e.g., data source A) or difference data sources (e.g., data sources A, B, C, N . . . ). Computer system 100 is configured to handle an arbitrary number datasets from an arbitrary number of data sources. Datasets may be different types of data and may be in any form. Different types of data include, for example, temperature data that is gathered from one or more temperature sensors, electronic exchange data for one or more securities, service call data such as the total number of call that a company received in a 24 hr period, and many other types of data. Virtually any type of data may be included in the multiple different datasets that are supplied by data sources to system 100. Indeed, the techniques herein are designed to work with hundreds or thousands of different datasets and their corresponding sources.

In certain instances, the data sources may include internal data sources (e.g., that are operated by the same organization that is operating computer system 100). Data sources may include data wire service providers (e.g., a data "wire" service similar in the way Reuters is a news service). In certain instances, the data sources may be subscribed to by system 100. The data sources and the data formats used for the dataset supplied by those data sources may be heterogeneous or homogeneous in nature and as such any type of data format may be acceptable.

In certain examples, the data from the various data sources may be stored in a data warehouse or data lake (not shown) that may then be queried and operated on by computer system 100. For example, data sources may supply datasets A, B, C, N to such a data warehouse and system 100 may access the data warehouse to process datasets stored therein.

An ETL (extract, transfer, load) module 102 is part of computer system 100. In certain examples, ETL module may also be its own dedicated computer system that communicates with computer system 100. ETL module 102 is responsible for: 1) extracting the data from the data sources (or the data warehouse where the data is stored); 2) transforming the data from its stored (or original format) into a format that is more suitable for analysis by training system 104; and 3) loading the data into another database or other storage for further processing by training system 104 and the modules therein.

Figure 5:
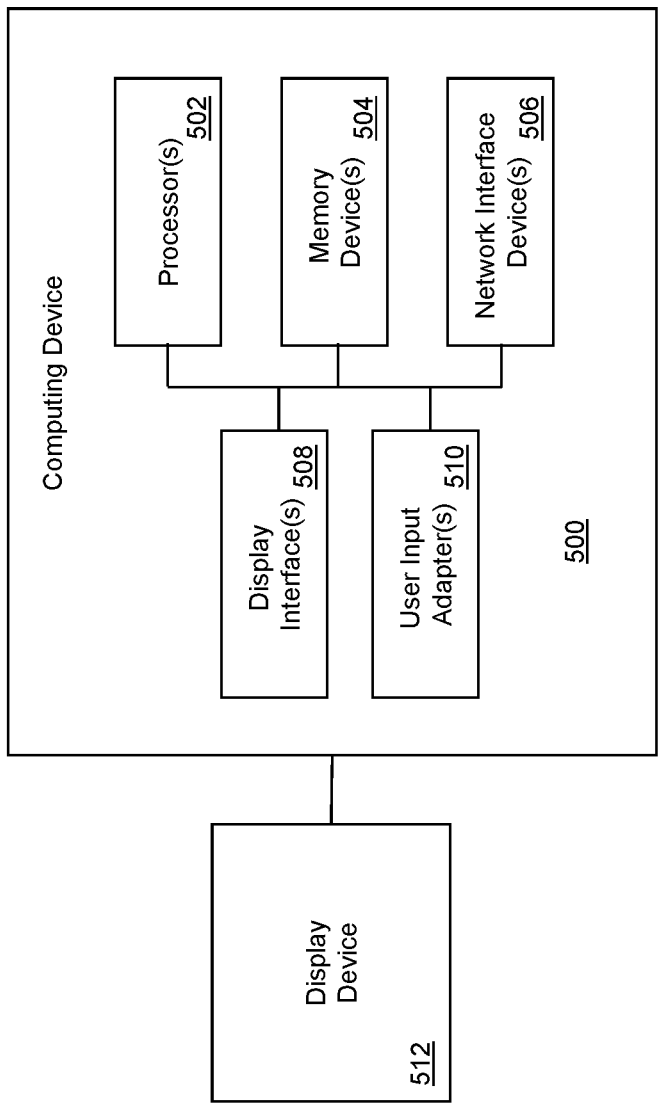
FIG. 5 shows an example computing device that may be used in some embodiments to implement features described herein.

In certain example embodiments, training system 104 can be its own computer system that is separate from the ETL module 102. Training system 104 may be implemented in a cloud-based computer environment and may be implemented across one or more physical computer nodes (e.g., as shown in FIG. 5). In certain examples, different components or modules of training system 104 may be implemented on virtual machines, which may be implemented on corresponding physical computer hardware.

Training system 104 includes three separate modules that operate to generate a dataset 112, that can be applied to a model (see FIG. 4), to achieve a target signal 114. These three modules include feature engineering module 106 (described in FIG. 2), dataset scanner module 108 (described in FIG. 3), and strategy designer module 110 (described in FIG. 4).

The feature engineering module 106 operates on data passed through the ETL module 102. Module 106 generates new columns of data that are based on the obtained source data. As one non-limiting example, the feature engineering module 106 may take the average of two (or more) pieces of data to generate a third piece of data. For example, it may average the high and low temperatures values from an original dataset to create a third value (the average). As explained below, other types of functions, transformations, and the like may be used for engineering feature data. The engineered datasets (which may include the original datasets) are passed onto the dataset scanner module 108. In certain examples, the functionality provided by the feature engineering module 106 may be skipped; for example, if no engineered features are needed for the processing.

Dataset scanner module 108 is part of the feedback loop used by training system 104 to generate the desired outputs (dataset 112 and a model for that dataset) for target signal 114. In certain examples, dataset scanner module 108 uses a heuristic hierarchical graph search on the data (which is organized by dataset and features of the individual datasets) to select a subset of the features (also called columns herein) to test. A selected feature set (multiple features) is then passed onto the strategy designer module 110—the other part of the feedback loop employed by training system 104.

Strategy designer module 110 uses machine learning to develop a strategy for the data of the selected feature set that is received from dataset scanner module 108. This strategy, along with metagradient information (also called metagradient or metagradient data) and the model that is generated for the selected feature set, cycle back to the dataset scanner 108 that iterates (taking into account the metagradient information) on what features to select next. This forms a feedback loop between the dataset scanner 108 and the strategy designer module 110. The returned metagradient information may indicate how effective or good each of the features within a selected feature set are with respect to a target and/or how effective the set of features is with respect to a target signal.

Figure 2:
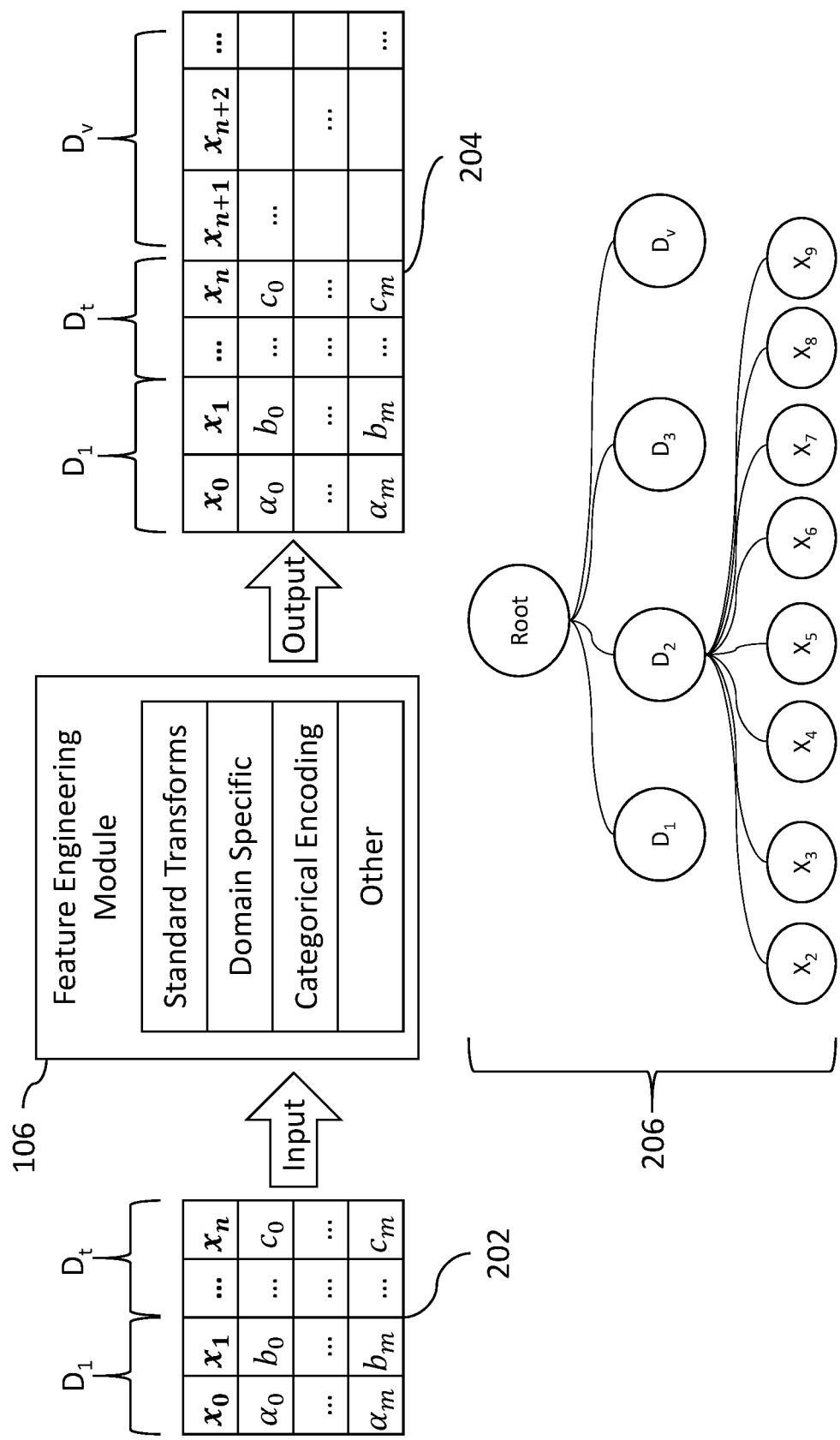
FIG. 2 illustrates an example feature engineering module of the system show in FIG. 1 according to certain example embodiments.

Description of FIG. 2—Feature Engineering:

FIG. 2 illustrates an example feature engineering module 106 of system 100 according to certain example embodiments. Input data 202 includes multiple different datasets $D_1$-$D_r$. And each dataset may include one or more features $X_0$-$X_n$ (also called columns) that each have individual values (rows). Input data 202 may be output from ETL module 102 as shown in FIG. 1 and/or a database that or other storage system that has been populated with data from the ETL module 102.

Feature engineering module 106 receives input data 202 and engineers additional features based on the input data. The engineering of additional features may use transforms, domain specific encoding, categorical encoding, or other processes that take some subset of the input data to engineer additional features from that input data. One example of how a feature may be engineered could be taking the average two features to engineer a third feature (e.g., taking the average of data from $X_0$ and $X_1$ to create data values under an engineered feature $X_{n+1}$). Other feature engineering may include encodings of the data, compression, decompression, maxes, mins, medians, etc.). The nature of the transforms, encodings or other processes that are performed by the feature engineering module 106 may be based on the type of data being handled. For example, the feature engineering may be selected based on the data being weather data, versus automobile performance data, or data from an electronic exchange computer system.

In any event, the process performed by the feature engineering module 106 results in output data 204. The output data 204 includes the original input data 202 (e.g., $D_1$-$D_t$) plus additional engineered features and the corresponding data for those features that have been engineered or otherwise added by the feature engineering module 106. The engineered features may be generated into one or more additional datasets $D_v$. In certain examples, features that are engineered from an original dataset may be included into the same engineered dataset.

In certain examples, features may be engineered from multiple different datasets. For example, a feature from a first dataset and a feature from a second dataset may be used to engineer a third feature (which may be included in the first, second, or a third new or existing dataset). For example, an engineered feature may be a calculated ratio between the average temperature in New York City and the average trading volume of the New York Stock Exchange. In certain examples, all engineered features may belong to their own dataset (e.g., a dataset for engineered features).

The features and datasets may be arranged in hierarchical graph 206 (a type of data structure), with each dataset (e.g., $D_1$-$D_v$) being a child of a root node and each feature (e.g., $X_2$-$X_9$) being a child of the node for the respective dataset. Thus, an output from feature engineering module 106 may be graph 206. In certain examples, each engineered dataset is included as a new node (e.g., $D_v$ in 206). In certain examples, all engineered features may be included as part of the same engineered feature dataset. In certain examples, engineered features are organized into engineered feature datasets that are based on the original data. Thus, an engineered feature that is based on dataset $D_1$ may include those engineered features that are based on features from $D_1$ and other features that are based on other datasets may be included in separate engineered feature datasets.

It will be appreciated that the feature engineering module 106 may be configured to operate automatically with any type of input. It will also be appreciated that in certain example embodiments the hierarchical relationship between features and engineered features (e.g., they share the same grandparent node) can help address the combinatorial explosion in selecting features (as discussed further herein).

Figure 3:
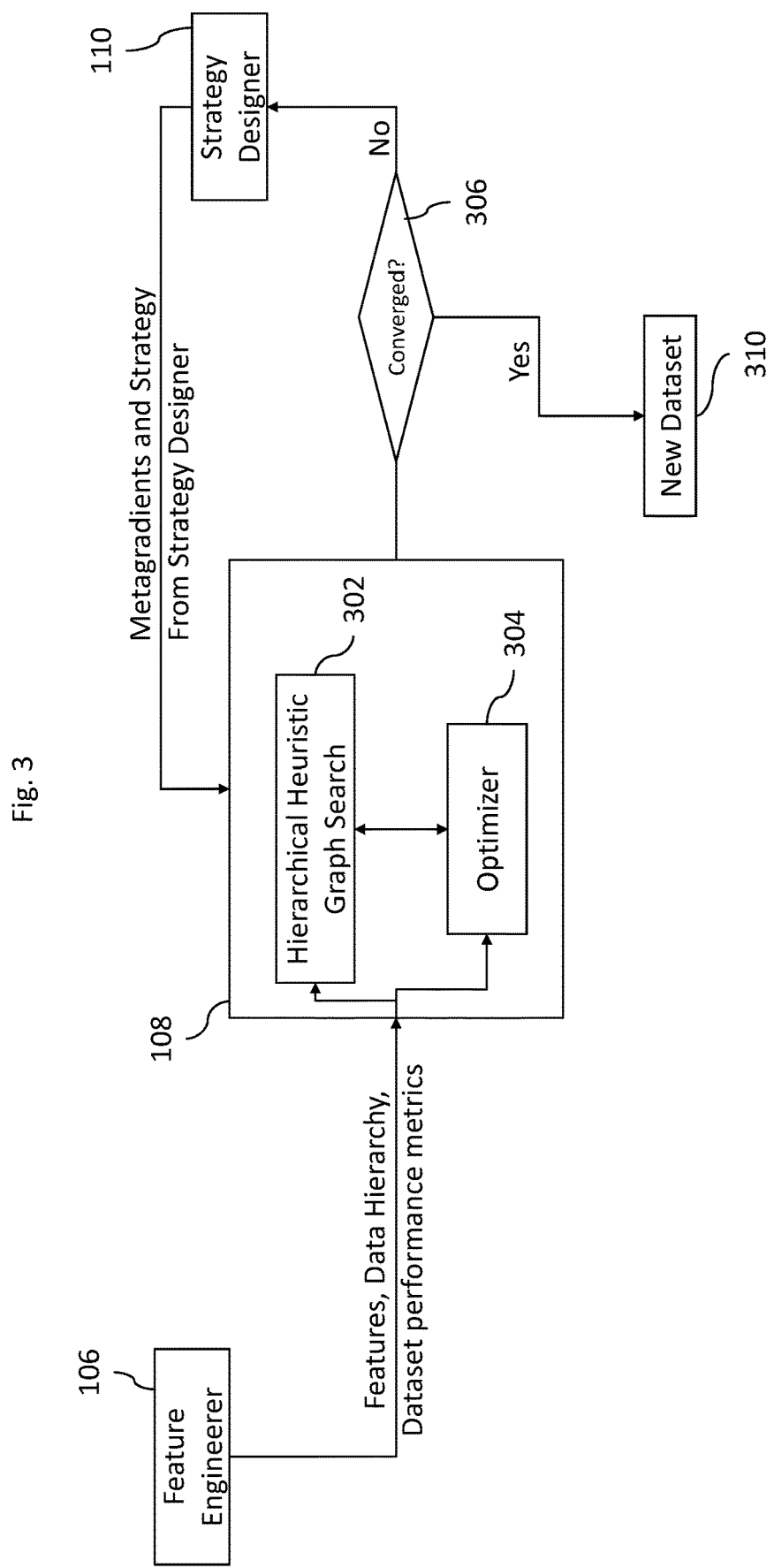
FIG. 3 illustrates an example dataset scanner module of the system shown in FIG. 1 according to certain example embodiments.

Description of FIG. 3—Dataset Scanner

FIG. 3 illustrates an example dataset scanner module 108 of the system shown in FIG. 1 according to certain example embodiments. Dataset scanner module 108 is configured to find a set of features (e.g., a plurality) that perform "well" (e.g., they exceed a predetermined threshold) at obtaining a target signal (e.g., satisfying a given function or model).

The dataset scanner module receives the features, the hierarchy of those features (e.g., tree 206), and dataset and/or feature performance metrics (e.g., metagradient information or how well a given feature or dataset performs with respect to a given target or metric). This data is then used by the dataset scanner module 108 as described herein.

In certain examples, the dataset scanner module 108 will operate with at least one penalty function, at least one constraint function, and/or at least one objective function. In certain examples, each overall use of system 100 for determining a set of features until convergence will use or rely on a single objective function. Such an objective function may remain throughout the process of determining a set of features, model, and strategy for that objective function. In certain examples, different objective functions may be used for different processes for finding features for the same target signal (an example of a target signal may be a buy/sell indicator for a stock, or a weather prediction for a city). The penalty and constraint functions may remain the same through a given process of determining a feature set. In certain examples, these functions may be toggable such that a user or administrator can turn them on and off on an as-needed basis (e.g., they may be based on user input). For example, multiple different objective functions may be stored within system 100 and may be usable depending on the nature of the target or type of features being sought after. In certain examples, the functions may be switched on (or off) based on the how a feature, or set of features has been processed.

The constraint functions indicate circumstances that will not occur when the features are being selected. For example, one constraint may be that every selected feature must be from a different dataset, or that if 4 features are selected then they must be from at least 3 different datasets. Constraints act to filter out feature sets that are not allowed.

Penalty functions may be used to penalize a certain set of circumstances in relation to selection of the features. In other words, something may be allowed to occur, it just "costs" more for that something (e.g., a feature) to be included and considered. Penalty functions may operate such that the more the penalty function is broken the "worse" the result will be graded. For example, a penalty function may be that every feature is from the same dataset. If features are from the same dataset are selected, then a 1% penalty is applied for each feature from the same dataset (e.g., if 5 features from the same dataset are selected then there is a 5% penalty applied).

Objective functions are objectives to be achieved for the feature set. Objective functions may be thought of as defining the value of found solutions (e.g., each feature set that is found by the strategy designer) that are permissible. Objective functions relate to the target or target signal that is being sought (e.g., the target used during training of a model for a given feature set). An example of a target signal in a stock market example may be total returns on investment. An objective function may take a weighted sum of the returns for positions (and a strategy potentially) and subtract, for example, transaction costs (e.g., the cost of performing each trade) or other costs, values, etc. . . . from the weighted sum to achieve a calculation that is "closer" the actual returns that may be generated. In other words, the objective function may, in certain cases, by used to further act upon or use the signal from the model and/or output of the strategy.

In certain examples, multiple ones of each of the functions may be included (e.g., 4 penalty functions, 2 constraint functions, and 3 objective functions—however in most cases one objective function will be used per process). These functions are used, in conjunction with the information (e.g., metagradient information) returned from the strategy designer 110, to select features from the graph search.

The dataset scanner module 108 includes two sub-modules, one determines what features to select (the hierarchical heuristic graph search module 302), and one that iteratively improves upon the sets of features that are found (the optimizer modules 304). Both of these modules thus work in tandem to select features that are then passed to strategy designer 110 for testing.

The hierarchical heuristic graph search module 302 starts (e.g., a first iteration of the process) with a full set of the features and datasets that are provided by the feature engineering module 106. This may be, for example, graph 206. Module 302 is responsible for initially selecting which features are to be tested. In certain examples, selection of features for a feature set may occur by selecting features based on which dataset they belong to rather than randomly picking features. This technique allows the search space for selecting features to be decreased thus increasing the efficiency of the training process.

Consider an example where datasets A, B, and C include corresponding features. Module 302 may initially pick features according to the parent datasets. For example, AAC is initially selected such that one feature from dataset A is selected, another feature from dataset A is selected, and one feature from dataset C is selected. In certain examples, the selection of an initial group of datasets (e.g., AAC) may be at random. In certain examples, the initial selection may be based on a weighted probability for each of the datasets and/or features within those datasets (e.g., AAC may have been selected because dataset A is weighted as 2, C as 1, and B as 0.25). Thus, the initially randomized selection may be influenced by the weights.

Once the parent datasets are selected, then the individual features within those datasets may be selected. In certain examples, this may be a random. Thus, for example, if dataset A includes features 1-6, module 302 may select feature 1 and feature 4. As with the selection of datasets, the selection of features may be influenced by the weights assigned to features that are within a dataset. In certain examples, the selection of features is performed without replacement. Thus, a feature will not be selected twice as the total set of features to drawn from is decreased upon selection of that feature. In certain examples, a constraint may be applied to control how the features are selected. For example, a constraint may prevent more than n features from dataset A being selected.

The Hierarchical Heuristic Graph Search module 302 may also include a heuristic that controls how often a given dataset is sampled. In certain examples, a relevancy value or other score for a dataset may be stored that relates to the target signal that is being sought. For example, if the target signal is predicting the next hurricane, a dataset with temperature values in the South Atlantic may be weighted more than a dataset with customer service call data. A heuristic may be applied to individual features as well based on how those features map to the target signal.

The likelihood of a dataset (or feature) being more or less relevant to a given target may be determined by testing just the dataset (or feature) against a given target. In certain example embodiments, each dataset and/or feature can include a relevancy score used by the heuristic to determine how often a given dataset or feature will be picked. The relevancy score (e.g., the weighted probability discussed above) may indicate how relevant the given dataset or feature is to a target (e.g., its relevance to the likelihood of a hurricane appearing).

Once the Hierarchical Heuristic Graph Search module 302 has selected an initial feature set, that feature set may be passed to the optimizer module 304. In certain examples, the optimizer is skipped for the initial feature set and passed directly to the strategy designer 110.

The optimizer module 304 is configured to take an initial selection of features and optimize those features (and their corresponding dataset) to be closer to the target function. In other words, if an initial selection of features is drawn from datasets AAC, the optimizer 304 may (after multiple iterations) determine that datasets "R," "E," "W" provide the best result (along with features within those individual datasets). This is accomplished by passing the selected features to the strategy designer 110 and subsequently optimizing which features to select from graph 206 based on returned metagradient information and/or other data returned from the strategy designer 110.

As an example, suppose $A_1A_3C_4$ (e.g., the first feature and third features in dataset A and the fourth feature in dataset C) is a set of features that is processed by strategy designer 110. The metagradient information that is returned from the strategy designer 110 may include information that $A_1$ performed well (e.g., represented by a value of 2), $A_3$ did not perform well (a value of 0.1), $C_4$ performed okay (represented by a value of 1), and the combination of $A_1C_4$ performed very well (represented by a value of 4). This metagradient information may be used to modify the selected features for the next iterations by dropping $A_3$ and keeping $A_1$ and $C_4$ (other modifications may be possible based on particular use cases). The graph search in 302 and/or the optimizer 304 may then be used to select a replacement for $A_3$ (the dropped feature) to be included in the selected feature set that is then passed back to the strategy designer 110 for processing.

In certain examples, the newly selected feature for the selected feature set is selected without replacement (e.g., $A_3$, $A_1$, and $C_4$ are removed from the set of possible selections for this next iteration—$A_1$ and $C_4$ are already selected and $A_3$ has been dropped). In certain examples, $A_3$ is dropped from the possible set of features for more than just the next iteration (e.g., it may be completely removed from the set of possible features for all future iterations for this target). Accordingly, in certain examples, the total number of features to select from may gradually decrease as more and more iterations are performed (and more and more features are "dropped"). In certain examples, a feature (e.g., $A_3$ in the above example) may be removed as a possible choice for just one iteration (or some other predetermined number of iterations). In certain examples, the number of iterations that a feature is removed is based on the metagradient for that feature (e.g., the worse the metagradient, the more iterations that feature is removed as being a selection).

In certain examples, the metagradient information 410 is used to determine what features (or group of features—i.e., any subset of features in the feature set) within the selected feature set (e.g., the set processed by the strategy designer 110) should be kept and what features should be discarded. In other words, how the feature set should be changed and/or how features within that feature set should be replaced and/or kept. In certain examples, the type of metagradient information may depend on the type of optimization process being used.

In certain examples, dataset scanner module 304 may include different types of optimizers. Optimizers may be based on one or more of the following optimization algorithms: gradient descent, Newton-Raphson, Nelder-Mead, ant colony, greedy search, and others. The optimizer that is used may depend on a particular problem or target. For example, if the model that is being developed is a decision tree, then the optimizer may determine the level of use of a particular feature in the decision tree. In other words, if feature "A" is used 5 times and feature "B" is used 1 time, the optimizer may favor including feature "A" in the feature set that is being analyzed (e.g., it will be picked more often by the optimizer).

The following is an illustrative example of how the optimizer may work. First, and initial grouping of datasets is determined. For example, AAB—or one feature from dataset A, another feature from dataset A, and a third feature from dataset B. Next, a selection of features from those datasets may be selected—e.g., $A_1$, $A_4$, and $B_6$, (e.g., feature 1 of A, feature 4 of A, and feature 6 of B). This feature group is then passed to the strategy designer 110 that returns metagradient information, model data, and a generated strategy for the tested feature set. As noted herein the metagradient information may represent how good each of the features within the tested feature set are and how good the collective set of features are. Metagradient information may represent the sensitivity of the objective function to features within a tested feature set and the fitness of an overall collective set of features. In certain examples, each instance of metagradient information returned from the strategy designer may represent a score of how likely that feature set will be used again (e.g., how well it performed).

In certain examples, multiple different instances of metagradient information may be combined to infer which features within those selected feature sets are "more" relevant or better for achieving a given target. For example, suppose features A, B, and C are in a first feature set and features A, B, and D are in a second feature set. The returned metagradient information for ABC may be a value of 2 (with higher numbers indicating the combination performed "better") and the metagradient information for ABD may be 1. Thus, the individual metagradient information with respect to A and B may be 3 (2+1), C may be 2, and D may be 1. The dataset scanner module may then (e.g., as part of the perturbation function) adjust the transitional probability of selecting A, B, C, and D according to the returned metagradient information. This may cause A and B to be selected (relatively) more often than previously (or more likely to be kept in the feature set that is next to be test), while D is not selected as often as A and B.

The optimizer module 304 uses the returned strategy and the returned metagradient information to update the heuristics and transitional probabilities in the graph search that is used to store the datasets and features. In certain examples, constraint functions and/or and penalty functions are also applied. Accordingly, the original graph and/or the heuristics associated with that graph may be updated and/or modified based on the returned strategy and metagradient information.

Converged block 306 in FIG. 3 tests if the convergence criteria is met for the selected feature set. If there is convergence, then a final feature set 310 and/or the dataset that is based on the feature set is output. If there is no convergence, then the new selected features are passed to the strategy designer 110.

In certain examples, convergence may be achieved by reaching or exceeding a predefined level of performance (returns on investment, accuracy, etc. . . . ). In certain examples, convergence may be satisfied by going through a predefined number of iterations without producing a new best performing model. In certain examples, convergence may be satisfied when a consecutive number of iterations have a performance improvement that is below a defined threshold. For example, if a threshold is 0.01 and a "best model" is 1 and a series of models is developed with values of 1, 1.0002, 1.001, 0.9999, then the models may be considered to have converged. In certain examples, convergence may be achieved when a best model is not improved upon after a given number of iterations.

Figure 4:
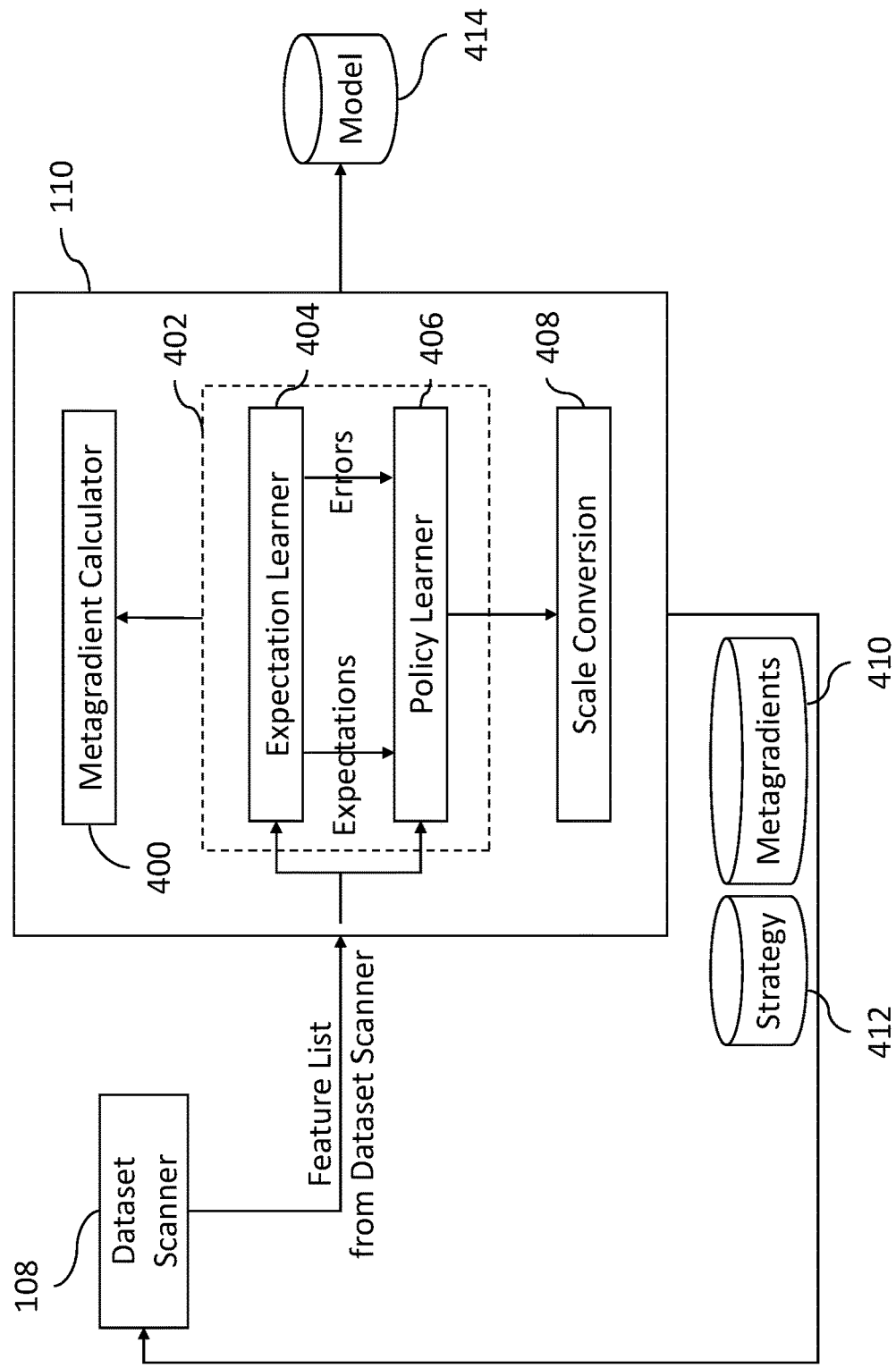
FIG. 4 illustrates an example strategy designer module of the system shown in FIG. 1 according to certain example embodiments.

Description of Strategy Designer Module—FIG. 4:

FIG. 4 illustrates an example strategy designer module 110 of the system shown in FIG. 1 according to certain example embodiments.

The feature list or set that is selected by the dataset scanner 108 is passed to the strategy designer module 110. Upon reception of the feature list, the strategy designer module (or another module) will retrieve the data in the columns associated with those features and generate a new dataset. During this process, NaNs (data that is not a number) are handled (e.g., set to zero or removed from the dataset) and the custom dataset is passed to the strategy module 110.

Specifically, the custom dataset is passed into expectation learner 404. Expectation learning is part of machine learning module 402 and the expectation learner 404 learns the target. The data is also passed to the policy learner 406, which also accepts the expectations and errors from the expectation learner 404. The policy learner module 406 takes the expectations about the target and converts it into an actionable strategy 412 (which is scaled by the scale converter module 408). A strategy may, in certain instances, be called a policy. The strategy reflects a strategy that is applied to the selected feature set to achieve (or at least seeks to achieve) the target signal. For example, if the target signal is a return on investment, then the derived strategy for a selected group of features is one that will be seek to achieve that target for those features.

One of the potential outputs from machine learning module 402 is model 414. Model 414 can be used for future datasets for the selected feature set to determine a strategy that should be implemented based on the input data. Thus, if a particular model is developed using the techniques herein with a feature set list A. Then that same model can be used again in 6 months with the same feature set list A that has updated data (e.g., to include the new data from the last 6 months) to develop a strategy that is based on or uses the originally created model.

Model 414 may include or refer to parameters of a model, the model parameterization, the model that is generated, and/or the strategy 412 (sometimes called policy). Accordingly, in certain examples, the generated model 414 and strategy 412 from strategy designer module 110 may be the same.

The following is an example where model 414 and strategy 412 may be the same (or nearly so). Model 414 is generated to provide a signal for buying or selling a stock (e.g., each day). A strategy 412 may be generated that uses that buy/sell signal to execute buying and selling the given stock (or a group of stocks, etc. . . . ). In such instances, the model and the strategy are functionally identical (or at least very similar). However, another strategy 412 may be generated that uses the same buy/sell signal from the same model that further acts upon the buy/sell signal. For example, a strategy may use the signal such that buys are only executed when there are two consecutive days in which the buy signal is output by the model. In such an instance, the strategy 412 further acts upon the signals output from model.

As another example, consider a model that predicts whether it will rain on a given day (e.g., the output from the model is just a yes/no for a rain prediction). A strategy that may be generated that makes use of that model output (e.g., it acts upon that output) may be to decide whether a person should bring an umbrella.

Scale conversion 408 takes the output signal from the machine learning module 402 and generates a human understandable element form (or other machine readable form). In certain instances, the scale conversion 408 acts as a translator between the machine learning module 402 and whatever is consuming the output from the machine learning module 402. If the consumer is a human, this may result in, for example, a red light/green light output, or a plus and a minus output.

Metagradient calculator 400 takes the resulting model 414 that is developed by the machine learning module 402 and processes that model to determine what is important about the model that was developed by the machine learning module 402. This may use, for example, LIME (Local Interpretable Model-Agnostic Explanations), Deep Taylor Decomposition/Expansion, Gini Score, and the like. In other words, the model developed by the machine learning module 402 is processed to obtain metagradient information 410 about the model (or features within the model). It will be appreciated that different techniques for acquiring metagradient information 410 may be used according to the techniques described herein.

In the end, the strategy designer 110 returns metagradient information 410 to the dataset scanner 108, the model 414 that converts the input signals to the output signals, and/or a strategy (e.g., which has been scaled by the scale conversion module 408). This information may be used to further evaluate and perturb the graph search that is performed by the dataset scanner module 108. In certain examples, the strategy may be passed to a user to determine how to proceed with that particular developed strategy.

Example Pseudocode

The following is example pseudo code for the dataset scanner 108:

*Require* :F:set of all feature sets
*Require* :H_p:Probability of selecting a feature in a hierarchy of all features
*Require* :|f|:number of features to find
1: f=*Select* n features with H_p from F
2: *While not* done (e.g., not converged) *do* :
3:   Strategy Designer(f,$\mathcal{L}$) → Strategy, Model, Metagradients
4:   *if* J(Strategy)≥max(J(Historic Strategies))
5:     Strategy, Model, f→best strategy, best model, best f
6:   Perturb_f (Metagradients,H_p )→f
7: *Return* (best strategy, best model, best f)

For the pseudo code example for dataset scanner 108, the set of all feature sets (or all features) is provided as "F". The probability of selecting a feature for a given selected feature set is provided as "H_p". As explained herein, this value may be static (e.g., the relevance value of a given feature) and may be further modified by the metagradient data that is generated during the processing performed by the strategy designer. In certain examples, the number of features to find (e.g. that will be included into a given feature set) may be provided as "|f|". In certain examples, this may be a maximum for the number of features or may be a strict value that all selected feature sets have such a number of features. Next, a selected feature set is generated from the set of all feature sets. The features within that selected set may be selected based on the H_p probability.

Once a first feature set is selected then the process continues until convergence. During the process, each selected feature set and a loss function are provided to the strategy designer 110 which returns a strategy, model, and metagradient data. If the objective that is achieved by the strategy (e.g., "J(Strategy)" is better than all previous achieved objectives for prior developed strategies, then the new best strategy is stored along with its correspond model and the features that were used to develop the model and strategy. A new feature set is selected (or the features within the feature set are replaced/changed) based on perturbing the set of all possible feature sets (or all possible features). This may take into account the returned metagradient information and/or the initial selection probabilities. Once convergence is achieved, then the best strategy, best model, and best selected feature set is returned as output.

The following is example pseudo code for the strategy designer 110:

*Require* :f: a set of features
*Require* :$\mathcal{L}$:loss function
1: Randomly initialize θ
2: *train*  θ *on* $\mathcal{L}_{s,t}\mathcal{L}(θ)$→*min* ($\mathcal{L}(θ)$)
3: Calculate objected J(θ)
4: Calculate Metagradients of θ relative to J
5: *Return* (J(θ), θ, Metagradients)

For the pseudo code example of the strategy designer 110, inputs may include a selected feature set (f) and a loss function ($\mathcal{L}$). The initialization of θ may include the initialization of the parameters of model, model parameterization, the model, and/or the strategy (sometimes called policy). The model (e.g., θ) is then trained on the loss function in a way that minimizes the loss function with respect given the model and/or strategy. This may include generating the model, parameters of model, model parameterization, and/or the strategy. Once the model is trained, then the objective U), which is sometimes called the objective function, is calculated with respect to the trained model and/strategy (e.g., it provides a value for the given feature set f). Metagradient information is then calculated for the model and/or strategy with respect to the calculated objective. Such metagradient be per feature and/or per feature set.

Description of FIG. 5

FIG. 5 is a block diagram of an example computing device 500 (which may also be referred to, for example, as a "computing device," "computer system," or "computing system") according to some embodiments. In some embodiments, the computing device 500 includes one or more of the following: one or more processors 502; one or more memory devices 504; one or more network interface devices 506; one or more display interfaces 508; and one or more user input adapters 510. Additionally, in some embodiments, the computing device 500 is connected to or includes a display device 512. As will explained below, these elements (e.g., the processors 502, memory devices 504, network interface devices 506, display interfaces 508, user input adapters 510, display device 512) are hardware devices (for example, electronic circuits or combinations of circuits) that are configured to perform various different functions for the computing device 500.

In some embodiments, each or any of the processors 502 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 502 uses an instruction set architecture such as x86 or Advanced RISC Machine (ARM).

In some embodiments, each or any of the memory devices 504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 502). Memory devices 504 are examples of non-volatile computer-readable storage media.

In some embodiments, each or any of the network interface devices 506 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 508 is or includes one or more circuits that receive data from the processors 502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 512, which displays the image data. Alternatively or additionally, in some embodiments, each or any of the display interfaces 508 is or includes, for example, a video card, video adapter, or graphics processing unit (GPU).

In some embodiments, each or any of the user input adapters 510 is or includes one or more circuits that receive and process user input data from one or more user input devices (not shown in FIG. 5) that are included in, attached to, or otherwise in communication with the computing device 500, and that output data based on the received input data to the processors 502. Alternatively or additionally, in some embodiments each or any of the user input adapters 510 is or includes, for example, a PS/2 interface, a USB interface, a touchscreen controller, or the like; and/or the user input adapters 510 facilitates input from user input devices (not shown in FIG. 5) such as, for example, a keyboard, mouse, trackpad, touchscreen, etc. . . .

In some embodiments, the display device 512 may be a Liquid Crystal Display (LCD) display, Light Emitting Diode (LED) display, or other type of display device. In embodiments where the display device 512 is a component of the computing device 500 (e.g., the computing device and the display device are included in a unified housing), the display device 512 may be a touchscreen display or non-touchscreen display. In embodiments where the display device 512 is connected to the computing device 500 (e.g., is external to the computing device 500 and communicates with the computing device 500 via a wire and/or via wireless communication technology), the display device 512 is, for example, an external monitor, projector, television, display screen, etc. . . .

In various embodiments, the computing device 500 includes one, or two, or three, four, or more of each or any of the above-mentioned elements (e.g., the processors 502, memory devices 504, network interface devices 506, display interfaces 508, and user input adapters 510). Alternatively or additionally, in some embodiments, the computing device 500 includes one or more of: a processing system that includes the processors 502; a memory or storage system that includes the memory devices 504; and a network interface system that includes the network interface devices 506.

The computing device 500 may be arranged, in various embodiments, in many different ways. As just one example, the computing device 500 may be arranged such that the processors 502 include: a multi (or single)-core processor; a first network interface device (which implements, for example, WiFi, Bluetooth, NFC, etc.; a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 500 may be arranged such that: the processors 502 include two, three, four, five, or more multi-core processors; the network interface devices 506 include a first network interface device that implements Ethernet and a second network interface device that implements WiFi and/or Bluetooth; and the memory devices 504 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the computer system 100, ETL module 102, training system 104, feature engineering module 106, dataset scanner 108, strategy designer 110, each of which will be referred to individually for clarity as a "component" for the remainder of this paragraph, are implemented using an example of the computing device 500 of FIG. 5. In such embodiments, the following applies for each component: (a) the elements of the 500 computing device 500 shown in FIG. 5 (i.e., the one or more processors 502, one or more memory devices 504, one or more network interface devices 506, one or more display interfaces 508, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 504 (e.g., in various embodiments, in a volatile memory device such as a RAM or an instruction register and/or in a non-volatile memory device such as a flash memory or hard disk) and all actions described herein as performed by the software modules are performed by the processors 502 in conjunction with, as appropriate, the other elements in and/or connected to the computing device 500 (i.e., the network interface devices 506, display interfaces 508, user input adapters 510, and/or display device 512); (c) alternatively or additionally, to the extent it is described herein that the component processes and/or otherwise handles data, in some embodiments, such data is stored in the memory devices 504 (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing device 500 (i.e., the network interface devices 506, display interfaces 508, user input adapters 510, and/or display device 512); (d) alternatively or additionally, in some embodiments, the memory devices 502 store instructions that, when executed by the processors 502, cause the processors 502 to perform, in conjunction with, as appropriate, the other elements in and/or connected to the computing device 500 (i.e., the memory devices 504, network interface devices 506, display interfaces 508, user input adapters 510, and/or display device 512), each or any combination of actions described herein as performed by the component and/or by any software modules described herein as included within the component.

Consistent with the techniques described herein, as one example, in an embodiment where an instance of the computing device 500 is used to implement the training system 104, the memory devices 504 could load program instructions for the functionality of the feature engineering module 106, the dataset scanner 108, and the strategy designer module 110. The data for all the features to be processed by feature engineering module 106 may be loaded from memory devices. The loaded features may be processed according the program instructions of the feature engineering module 106 to generate engineered features that are then stored to memory devices 504. Processes (which may operate within virtual machines that implemented the modules described herein) may then execute the dataset scanner and/or strategy designer as described herein.

The hardware configurations shown in FIG. 5 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 5, (e) via other hardware arrangements, architectures, and configurations, and/or via combinations of the technology described in (a) through (e).

Technical Advantages of Described Subject Matter

In certain example embodiments, the techniques herein allow for an improved technique in selecting features from a large number of possible features (e.g., hundreds or thousands). Certain examples use metagradient information generated from a model developed using machine learning. The metagradient information is then used to select new features for further feature sets to test. This type of approach allows a process to handle problems that have an extremely large number of possible combinations. For example, the techniques herein can be used to handle combinations in excess of $10^{17}$—which would otherwise be computationally infeasible to process. The techniques herein employ a smarter approach to selecting or generating features to be tested (via the metagradient information) than random selection which may be a more conventional approach. This smarter approach may improve convergence and/or a number of search iterations needed to reach convergence. This allows for a more efficient (e.g., better than random) use of computing resources (CPU, memory, etc. . . . ) when finding solutions.

The technical features described herein may thus improve the speed at which relevant combinations of seeming unrelated data can be analyzed and processed to determine previously unknown correlations between different datasets and features in those datasets.

In certain examples, the techniques improve the models that are developed while avoiding limitations related to the Data Processing Inequality (e.g., that one cannot improve a model by just engineering features). The improved models are generated by finding higher quality permutations of data rather than a conventional approach of simply adding more features to develop a model. Using fewer (and smarter) features to develop a model allows for a faster learning and runtimes.

The technical features herein also may allow the features of very diverse datasets to be analyzed together. For example, the number of mobile phones sold in June may be one dataset, the volume of cars in the shopping mall may be another dataset, and the weather may be a third dataset. Features from these three datasets may be analyzed together using the techniques described herein to uncover important insights. This is made possible by the metagradient based feedback loop that allows for rapid exploration and discovery of useful combinations of features from a large number of heterogeneous datasets. The metagradient information may provide information on the datasets, the features, or feature combinations that allow for a more targeted and useful selection of features from across the heterogeneous datasets.

The techniques herein also allow for a high level of customization through the use of objectives, constraints, and penalties.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-4, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
a non-transitory storage medium configured to store:
   a plurality of datasets, with each one of the plurality of datasets including a corresponding plurality of features, and
   a plurality of weights, wherein each of the plurality of features of each of the plurality of datasets is assigned one of the plurality of weights;
a processing system comprising instructions that, when executed by at least one hardware processor included with the processing system, cause the at least one hardware processor to perform operations comprising:
   (a) generating a feature set by selecting multiple features from among datasets of the plurality of datasets, wherein at least one feature from each of the datasets is selected to be included in the multiple features, wherein each one of the multiple features is selected based on the weight that is assigned to that corresponding one of the multiple features;
   (b) performing a training process using data values for each of the multiple features of the generated feature set to generate a model;
   (c) calculating metagradient data for the feature set based on the model that has been generated, wherein the calculated metagradient data represents how the generated feature set performed for an objective function;
   (d) adjusting, by using the calculated metagradient data for the feature set, at least one of the weight(s) that is assigned to a corresponding one of the multiple features of the generated feature set; and
   repeating at least (a)-(d) for a plurality of iterations, with each iteration generating a new feature set according to (a) that takes into account how the at least one of the weight(s) have been adjusted according to (d), wherein (a)-(d) are repeated until a convergence criteria is satisfied for the feature set that has been generated from (a) for the model that is generated from (b), wherein the objective function is used in each of the plurality of iterations, wherein composition of the generated feature set changes across the plurality of iterations that are repeated.

2. The computer system of claim 1, wherein the plurality of datasets and each corresponding plurality of features are arranged into a hierarchical graph data structure.

3. The computer system of claim 2, wherein the hierarchical graph data structure includes a root node with a plurality of first child nodes that each correspond to one of the plurality of datasets, wherein each of the plurality of first child nodes has a plurality of second child nodes that each correspond to one of the plurality of features of a corresponding dataset.

4. The computer system of claim 2, wherein the operations further comprise:
generating an engineered dataset that includes a plurality of engineered features, the engineered dataset being one of the plurality of datasets, wherein each new feature set is generated by using the using the hierarchical graph data structure in combination with the weights.

5. The computer system of claim 1, wherein selection of the multiple features of the generated feature set includes applying at least one of a penalty function or at least one constraint function.

6. The computer system of claim 1, wherein generating the feature set includes: selecting the datasets from among the plurality of datasets and then, after the datasets are selected, selecting the multiple features from within the selected datasets as those to be included within the generated feature set.

7. The computer system of claim 6, wherein each of the plurality of datasets is assigned a corresponding weight and selection of the datasets is further based on the corresponding weight.

8. The computer system of claim 1, wherein the operations further comprise:
calculating a relevancy value for each one of the plurality of datasets that indicates the relevancy of a corresponding dataset to a target signal.

9. The computer system of claim 8, wherein generation of the feature set is further based on based on the relevancy value that is associated with each of the plurality of datasets.

10. The computer system of claim 1, wherein the training process includes applying an expectation learner and a policy learner.

11. The computer system of claim 1, wherein the weight that is assigned to that corresponding one of the multiple features corresponds to a probably of being selected within the dataset to which the corresponding one of the multiple features belongs.

12. A method performed on a computer system that includes at least one hardware processor, the method comprising:
storing a plurality of datasets, with each one of the plurality of datasets including a corresponding plurality of features;
storing a plurality of weights, wherein each of the plurality of features of each of the plurality of datasets is assigned one of the plurality of weights;
(a) generating a feature set by selecting multiple features from among datasets of the plurality of datasets, wherein at least one feature from each of the datasets is selected to be included in the multiple features, wherein each one of the multiple features is selected based on the weight that is assigned to that corresponding one of the multiple features;
(b) performing a training process using data values for each of the multiple features of the generated feature set to generate a model;
(c) calculating metagradient data for the feature set based on the model that has been generated, wherein the calculated metagradient data represents how the generated feature set performed for an objective function;
(d) adjusting, by using the calculated metagradient data for the feature set, at least one of the weight(s) that is assigned to a corresponding one of the multiple features of the generated feature set; and
repeating at least (a)-(d) for a plurality of iterations, with each iteration generating a new feature set according to (a) that takes into account how the at least one of the weight(s) have been adjusted according to (d), wherein (a)-(d) are repeated until a convergence criteria is satisfied for the feature set that has been generated from (a) for the model that is generated from (b), wherein the objective function is used in each of the plurality of iterations, wherein composition of the generated feature set changes across the plurality of iterations that are repeated.

13. The method of claim 12, wherein the plurality of datasets and each corresponding plurality of features are arranged into a hierarchical graph data structure.

14. The method of claim 13, wherein the hierarchical graph data structure includes a root node with a plurality of first child nodes that each correspond to one of the plurality of datasets, wherein each of the plurality of first child nodes has a plurality of second child nodes that each correspond to one of the plurality of features of a corresponding dataset.

15. The method of claim 14, wherein each new feature set is generated by using the using the hierarchical graph data structure in combination with the weights.

16. The method of claim 12, wherein selection of the multiple features of the generated feature set includes applying at least one of a penalty function or at least one constraint function.

17. The method of claim 12, wherein generating the feature set includes: selecting the datasets from among the plurality of datasets and then, after the datasets are selected, selecting the multiple features from within the selected datasets as those to be included within the generated feature set.

18. A non-transitory computer readable storage medium storing computer executable instructions for use with a computer system that that includes at least one hardware processor, the computer executable instructions comprising instructions that cause the computer system to perform operations comprising:
storing a plurality of datasets, with each one of the plurality of datasets including a corresponding plurality of features;
storing a plurality of weights, wherein each of the plurality of features of each of the plurality of datasets is assigned one of the plurality of weights;
(a) generating a feature set by selecting multiple features from among datasets of the plurality of datasets, wherein at least one feature from each of the datasets is selected to be included in the multiple features, wherein each one of the multiple features is selected based on the weight that is assigned to that corresponding one of the multiple features;
(b) performing a training process using data values for each of the multiple features of the generated feature set to generate a model;
(c) calculating metagradient data for the feature set based on the model, wherein the calculated metagradient data represents how the generated feature set performed for an objective function;
(d) adjusting, by using the calculated metagradient data for the feature set, at least one of the weight(s) that is assigned to a correspond one of the multiple features of the generated feature set; and
repeating at least (a)-(d) for a plurality of iterations, with each iteration generating a new feature set according to (a) that takes into account how the at least one of the weight(s) have been adjusted according to (d), wherein (a)-(d) are repeated until a convergence criteria is satisfied for the feature set that has been generated from (a) for the model that is generated from (b), wherein the objective function is used in each of the plurality of iterations, wherein composition of the generated feature set changes across the plurality of iterations that are repeated.

19. The non-transitory computer readable storage medium according to claim 18,
wherein the weight that is assigned to that corresponding one of the multiple features corresponds to a probably of being selected within the dataset to which the corresponding one of the multiple features belongs.

20. The non-transitory computer readable storage medium according to claim 18, wherein generating the feature set includes: selecting the datasets from among the plurality of datasets and then, after the datasets are selected, selecting the multiple features from within the selected datasets as those to be included within the generated feature set.

\* \* \* \* \*